US007251790B1

(12) United States Patent
Drucker et al.

(10) Patent No.: US 7,251,790 B1
(45) Date of Patent: Jul. 31, 2007

(54) MEDIA BROWSING SYSTEM DISPLAYING THUMBNAILS IMAGES BASED ON PREFERENCES OF PLURALITY OF USERS AND PLACING THE THUMBNAILS IMAGES AT A SCENE CHANGE

(75) Inventors: Steven M. Drucker, Bellevue, WA (US); Curtis G. Wong, Bellevue, WA (US); Asta L. Glatzer, Redmond, WA (US); Steven Douglas De Mar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 634 days.

(21) Appl. No.: 10/055,539

(22) Filed: Jan. 23, 2002

(51) Int. Cl.
*G06F 3/048* (2006.01)

(52) U.S. Cl. .................. 715/838; 348/333.05
(58) Field of Classification Search ............... 709/231, 709/246; 245/667; 715/838, 721; 348/333.05, 348/220.1, 207.99; 386/46; 345/838, 810; 707/1; 705/14; 382/224
See application file for complete search history.

(56) References Cited

U.S. PATENT DOCUMENTS

| 5,933,137 A | * | 8/1999 | Anderson | 715/720 |
|---|---|---|---|---|
| 5,999,173 A | | 12/1999 | Ubillos | 345/328 |
| 6,128,587 A | * | 10/2000 | Sjolander | 703/2 |
| 6,215,523 B1 | * | 4/2001 | Anderson | 348/333.05 |
| 6,233,389 B1 | | 5/2001 | Barton et al. | 386/46 |
| 6,236,395 B1 | | 5/2001 | Sezan et al. | 345/328 |
| 6,262,724 B1 | | 7/2001 | Crow et al. | 345/328 |
| 6,327,418 B1 | | 12/2001 | Barton | 286/46 |
| 6,747,674 B1 | * | 6/2004 | Asami | 715/721 |
| 2002/0094191 A1 | * | 7/2002 | Horie et al. | 386/46 |
| 2002/0116715 A1 | * | 8/2002 | Apostolopoulos | 725/86 |
| 2002/0120607 A1 | * | 8/2002 | Price et al. | 707/1 |
| 2002/0163545 A1 | * | 11/2002 | Hii | 345/838 |
| 2002/0180803 A1 | * | 12/2002 | Kaplan et al. | 345/810 |
| 2003/0028672 A1 | * | 2/2003 | Goldstein | 709/246 |
| 2003/0123737 A1 | * | 7/2003 | Mojsiolovic et al. | 382/224 |
| 2003/0197785 A1 | * | 10/2003 | White et al. | 348/207.99 |
| 2004/0201715 A1 | * | 10/2004 | Ishimura et al. | 348/220.1 |
| 2004/0204985 A1 | * | 10/2004 | Gibson et al. | 705/14 |

* cited by examiner

*Primary Examiner*—Le Hien Luu
(74) *Attorney, Agent, or Firm*—Amin, Turocy & Calvin, LLP

(57) ABSTRACT

A system and method facilitating media browsing is provided. The invention includes a media delivery system adapted to provide media and thumbnail image(s) to a media display component. The invention further provides for a media delivery system to include a media analyzer, a thumbnail generator and a media player. The media analyzer can analyze content of media that the thumbnail generator can utilize in generating thumbnail image(s).

27 Claims, 16 Drawing Sheets

MEDIA BROWSING SYSTEM DISPLAYING THUMBNAILS IMAGES BASED ON PREFERENCES OF PLURALITY OF USERS AND PLACING THE THUMBNAILS IMAGES AT A SCENE CHANGE

TECHNICAL FIELD

The present invention relates generally to media browsing systems, and more particularly to a system and method facilitating media browsing using thumbnail image(s).

BACKGROUND OF THE INVENTION

Conventionally, media browsing systems (e.g., VCR's) have provided limited ability for a user to intelligently browse media. For example, many media browsing systems provide a user the ability to "fast forward" or "rewind" media. However, the user typically blindly proceeds through the media stopping at random interval(s) to preview the media. Conventional media browsing schemes are typically rigid and do not account for specific needs/desires of individual viewers. As such, the media experience can be impaired by the awkwardness associated with convention browsing.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates generally to a system and method facilitating media browsing utilizing thumbnail image(s). In accordance with the invention thumbnail image (s) are concurrently displayed with associated media. The thumbnail image(s) facilitate identifying past and future portion(s) of the media so as to aid a viewer with browsing through the media. The thumbnail image(s) can be predefined and/or dynamically generated according to the invention. For example, a media analyzer can analyze the media and a thumbnail generator employing results of the media analyzer can generate thumbnail image(s) associated with the media.

In accordance with one particular aspect of the invention, displayed thumbnail image(s) can be employed as links to portion(s) of the media associated with the respective thumbnail image(s).

In accordance with another aspect of the invention, the number of thumbnail image(s) displayed can be user defined and/or automatically generated based upon certain criteria (e.g., amount of screen space available, type of media, length of media). Moreover, the number of thumbnail image (s) corresponding to past displayed portions of the media can differ from the number of thumbnail image(s) associated with future (e.g., unplayed) portions of the media.

Another aspect of the invention provides for streaming media to a viewer and concurrently streaming thumbnail image(s) corresponding to various portions of the media (e.g., previously streamed media and/or media to be streamed). By selecting a particular thumbnail image, the media being streamed is modified so that the media being streamed corresponds to a point at or about a location associated with the thumbnail image.

Yet another aspect of the invention provides for thumbnail image(s) to be dynamically generated in accordance with the amount of media already displayed and to be displayed. Thus, the generation of thumbnail image(s) can be temporally associated with media length portions employing a currently viewed section of the media serving as a reference point.

Other aspects of the present invention provide methods methodologies for generating thumbnail image(s), utilizing thumbnail image(s), a computer readable medium having computer usable instructions for a media delivery system and a data packet adapted to be transmitted between two or more computer processes comprising information associated with a media input and information associated with at least one thumbnail image related to the media input.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
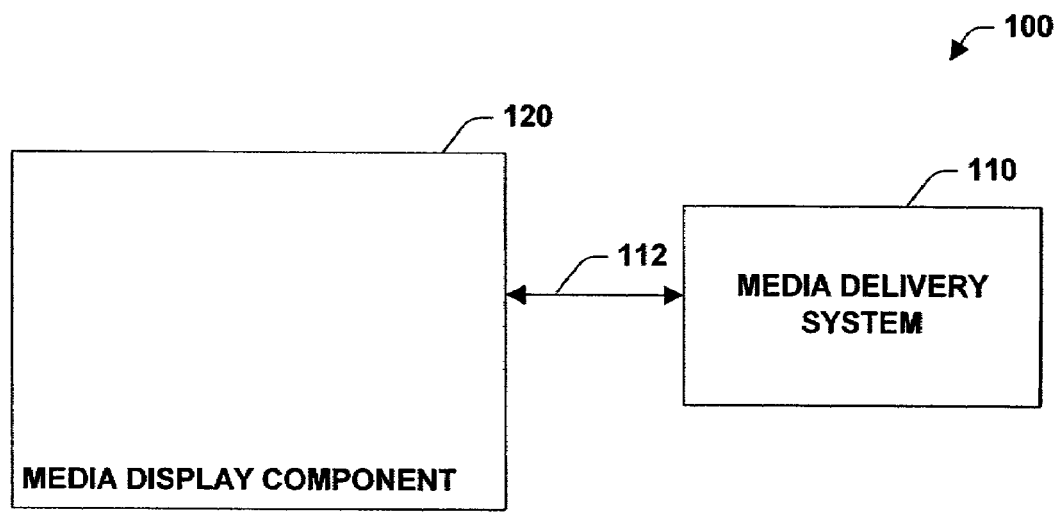
FIG. 1 is block diagram of a media browsing system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

Further, "media" is intended to refer to audio and/or visual representation(s) of information. Media can be based on a television broadcast (e.g., real-time and/or recorded), cable television, computer network audio/video streaming (e.g., Internet-based), a video-tape, a Digital Video Disc ("DVD"), a Compact Disc ("CD") and/or a computer disc. Media can be time-based, for example, a movie. Additionally, media includes non time-based representation(s), for example, image(s) (e.g., photograph(s)).

Referring to FIG. 1, a media browsing system 100 in accordance with an aspect of the present invention is illustrated. The media browsing system 100 includes a media delivery system 110 and a media display component 120.

Figure 2:
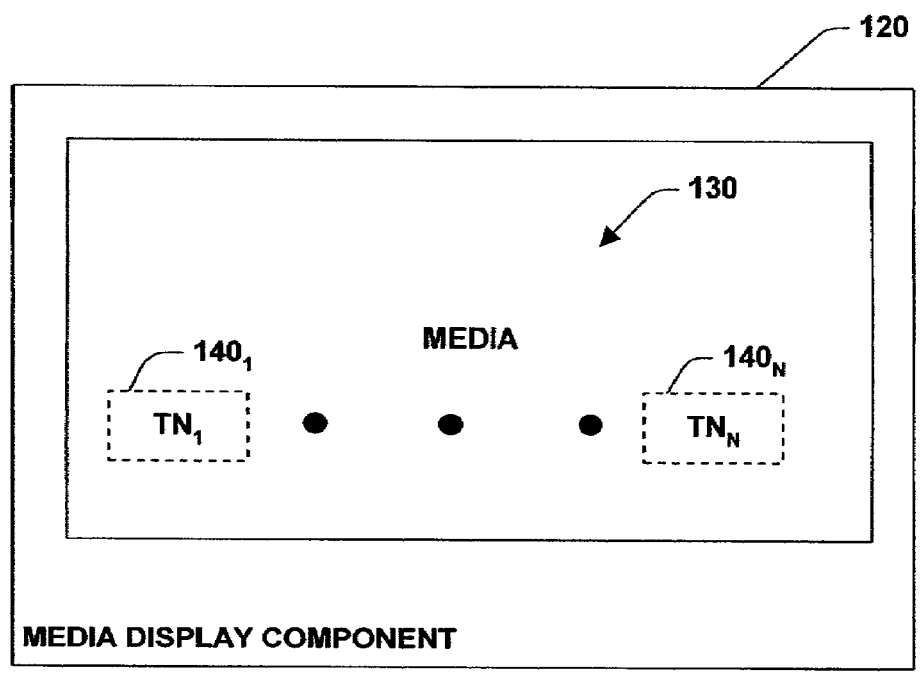
FIG. 2 is block diagram of a media display component in accordance with an aspect of the present invention

Turning briefly to FIG. 2, the media display component 120 is adapted to display media 130. For example, the media display component 120 can include a television screen, a computer monitor and/or a touch screen. The media display component 120 is further adapted to display a first thumbnail image $140_1$ through an Nth thumbnail image $140_N$, N being an integer greater to or equal to one. The first thumbnail image $140_1$ through the Nth thumbnail image $140_N$ can be referred to collectively as the thumbnail image(s) 140. The thumbnail image(s) 140 are related to the media 130. The number of thumbnail image(s) 140 can be based, at least in part, upon a user's selection, user's preference(s) and/or analysis of the media 130 by the media delivery system 110. Further, the number of thumbnail image(s) 140 can be based, at least in part, upon a display area available associated with the media display component 120, an amount of the media 130 already displayed and an amount of the media 130 remaining to be displayed.

Optionally, a series of thumbnail image(s) 140 can be displayed in a single thumbnail image area, the series of thumbnail image(s) 140 periodically being displayed in the thumbnail image area.

Referring back to FIG. 1, the media delivery system 110 is coupled to the media display component 120 via a first communications link 112. For example, the first communications link 112 can be a parallel electrical connection, a serial electrical connection, a cable television connection, a satellite connection, a computer network connection (e.g., utilizing the Internet), a Digital Subscriber Line ("DSL"), a telephone line, a cable modem, a wireless data communications link and/or an integrated services digital network ("ISDN"). Further, the communications link 112 can carry a signal between the media delivery system 110 and the media display component 120. For example, the signal format(s) can include analog television (cable, satellite, etc.), digital television and/or other format(s). The media delivery system 110 and the media display component 120 can employ standard format(s), for example, Direct Satellite Systems ("DSS"), Advanced Television ("ATV") systems, Digital Television ("DTV") systems, Video-on-Demand, MPEG over ATM Networks, High Definition Television ("HDTV") and/or cable (e.g., DVB-C).

The media delivery system 110 is further adapted to provide the media 130 and the thumbnail image(s) 140 related to the media 130 to the media display component 120. The media 130 can include, for example, audio and/or video content. For example, the media 130 can be based on a television broadcast (e.g., real-time and/or recorded), cable television, computer network audio/visual streaming (e.g., Internet-based), a video-tape, a Digital Video Disc ("DVD"), a Compact Disc ("CD") and/or a computer disc. The media 130 can be time-based.

The media delivery system 110 is further adapted to modify the media 130 sent to the media display component 120 based at least in part upon selection of one of the thumbnail image(s) 140 related to the media 130 (e.g., user's selection). For example, in the instance where the media 130 is a television program, the media delivery system 110 can provide thumbnail image(s) 140 related to the television program. The thumbnail image(s) 140 can be, for example, temporally based (e.g., 30 second intervals) and/or content based (e.g., based on scene change(s)). Upon selection of one of the thumbnail image(s) 140 (e.g., by a user), the media delivery system 110 provides media 130 beginning at or about the location identified by the selected thumbnail image. The invention can be tailored for example to more heavily weigh a scene change over a time interval if the scene change occurs within a certain proximity to the time interval. For instance, scene changes or breaks serve generally to provide more content information than an arbitrary frame in a media. Thus, by generating a thumbnail corresponding to a scene change or break as compared to a media frame within close proximity the present invention can further enhance a viewer media experience.

Figure 3:
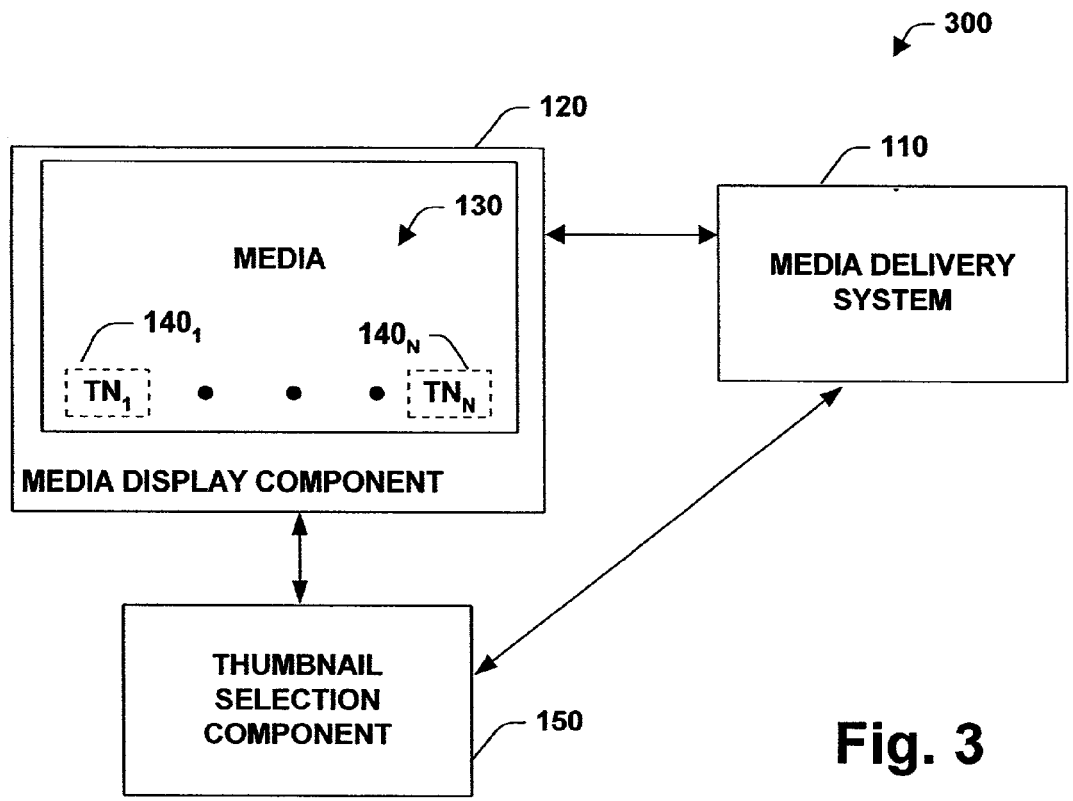
FIG. 3 is a block diagram of a media browsing system in accordance with an aspect of the present invention.

Turning to FIG. 3, a media browsing system 300 in accordance with an aspect of the present invention is illustrated. The media browsing system 300 includes a media delivery system 110 and a media display component 120. The media display component 120 includes thumbnail image(s) 140. The media browsing system 300 further includes a thumbnail selection component 150.

The thumbnail selection component 150 is coupled to the media display component 120 and/or the media delivery system 110 (e.g., via an electrical connection and/or wireless connection). The thumbnail selection component 150 is further adapted to facilitate selection (e.g., by a user) of one of the thumbnail image(s) 140. For example, for a media browsing system 300 in which the media display component 120 includes a television screen, the thumbnail selection component 150 can include a remote control. The thumbnail selection component 150 can facilitate navigation through the thumbnail image(s) 140. For example, the thumbnail selection component 150 can include a remote control having left and right arrows facilitating scrolling through the thumbnail image(s) 140. In the instance where substantially all of the thumbnail image(s) 140 cannot be displayed at one time via the media display component 120 (e.g., based on user preference(s), number of thumbnail image(s) 140 and/or the size of the thumbnail image(s) 140), the thumbnail selection component 150 can facilitate navigation though the thumbnail image(s) 140 (e.g., bi-directionally and/or uni-directionally).

The thumbnail selection component 150 can further facilitate selection of thumbnail image(s) 140 (e.g., via an "enter" and/or "select" key). For example, once a user has scrolled through some of the thumbnail image(s) 140, the user can identify a particular thumbnail image associated with a desired portion of the media 130 via the thumbnail selection component 150. The thumbnail selection component 150, for example, can include a remote control, a touch screen, a mouse and/or a joystick.

Figure 4:
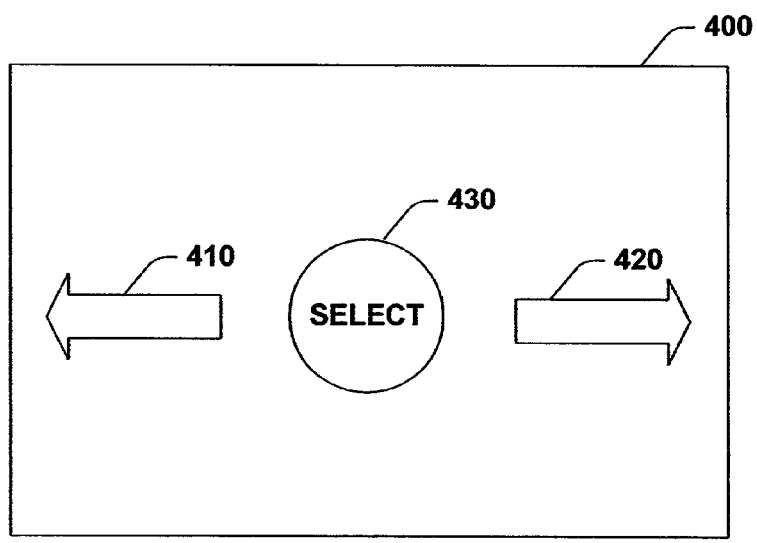
FIG. 4 is a block diagram of a thumbnail selection component in accordance with an aspect of the present invention.

Referring to FIG. 4, a thumbnail selection component 400 in accordance with an aspect of the present invention is illustrated. The thumbnail selection component 400 includes a left navigation key 410, a right navigation key 420 and a select key 430. For example, the left key 410 can facilitate scrolling left through thumbnail image(s) 140 while the right navigation key 420 can facilitate scrolling right through thumbnail image(s) 140. Once a user has identified a particular thumbnail image the user desires to select, the user can select the thumbnail image utilizing the select key 430. The thumbnail selection component 400 is presented for purposes of illustration of an aspect of the present invention and is not intended to limit the present invention. For example, in accordance with another aspect of the present invention, a thumbnail selection component 150 employing a single key having multiple functions (e.g., facilitating navigation and selection) can be employed. Accordingly, any suitable means for navigating and/or selecting thumbnail image(s) 140 can be utilized in accordance with the present invention.

It is to be appreciated that the thumbnail selection components discussed herein can include a variety of additional functionality (e.g., up and down scroll keys, haptic-like functionality, and functionality associated with conventional graphics navigation tools).

Figure 5:
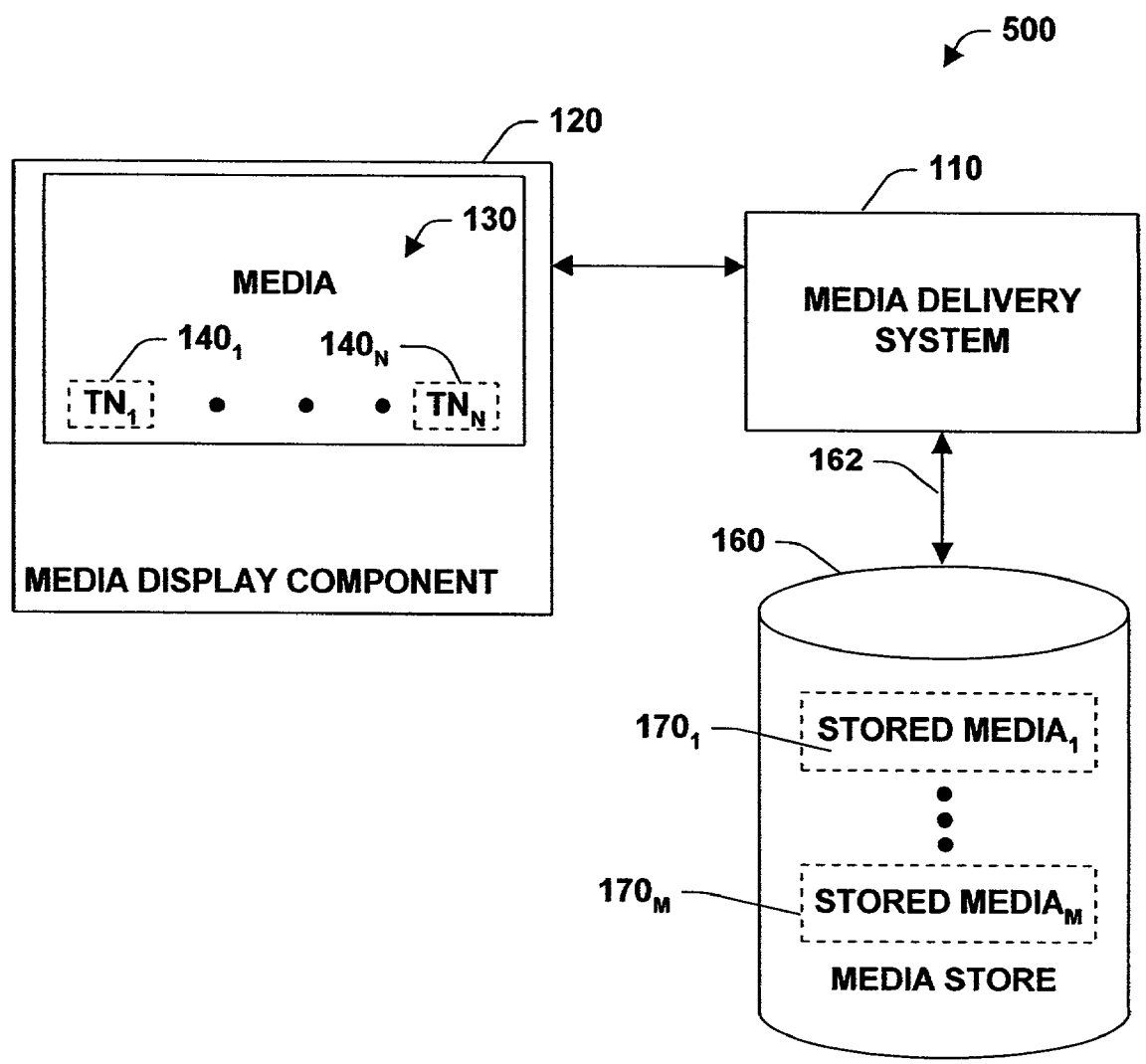
FIG. 5 is a block diagram of a media browsing system in accordance with an aspect of the present invention.

Turning to FIG. 5, a media browsing system 500 in accordance with an aspect of the present invention is illustrated. The media browsing system 500 includes a media delivery system 110 and a media display component 120 having thumbnail image(s) 140. The media browsing system 500 further includes a media store 160 having a first stored media $170_1$ through an Mth stored media $170_M$, M being an integer greater to or equal to one. The first stored media $170_1$ through the Mth stored media $170_M$ can be referred to collectively as the stored media 170.

The media delivery system 110 can be coupled to the media store 160 by a second communications link 162. The second communications link can be a parallel electrical connection, a serial electrical connection, a cable television connection, a satellite connection, a computer network connection (e.g., utilizing the Internet), a Digital Subscriber Line ("DSL"), a telephone line, a cable modem, a wireless data communications link and/or an integrated services digital network ("ISDN").

For example, in a media browsing system 500 that is stand-alone, the media store 160 can include computer storage media (e.g., hard disc, CD's and/or DVD's). The media delivery system 110 can obtain at least some of the stored media 170 and provide at least a portion thereof to the media display component 120 along with the thumbnail image(s) 140.

While FIG. 1 is a schematic diagram illustrating components for the system 100, it is to be appreciated that the system 100 can be implemented as one or more components, as that term is defined herein. Thus, it is to be appreciated that computer executable components operable to implement the system 100 can be stored on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the present invention.

Figure 6:
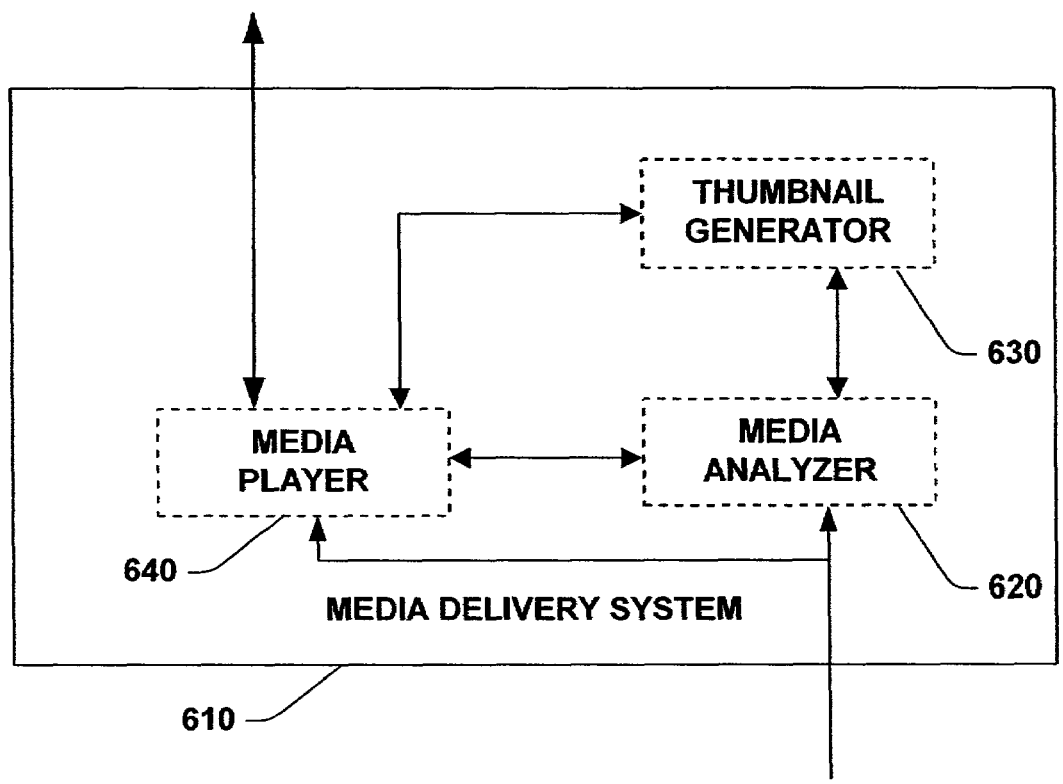
FIG. 6 is block diagram of a media delivery system in accordance with an aspect of the present invention.

Referring to FIG. 6, a media delivery system 610 in accordance with an aspect of the present invention is illustrated. The media delivery system 610 includes a media analyzer 620, a thumbnail generator 630 and a media player 640.

The media analyzer 620 receives a media input (e.g., from a media store (not shown)) and analyzes the media input. The media analyzer 620 can analyze the content of the media input, for example, for scene change(s) and/or shot boundaries. A shot boundary can be based, for example, on a histogram of image(s) of the media input and analysis for overall change(s) in color and/or brightness. Additionally, the media analyzer 620 can analyze media based, at least in part, upon a user's preference. The media analyzer 620 can utilize artificial intelligence technique(s) (e.g., Bayesian learning methods that perform analysis over alternative dependent structures and apply a score, Bayesian classifiers and other statistical classifiers, including decision tree learning methods, support vector machines, linear and non-linear regression, and neural network representation) in analyzing the media input. For example, the media analyzer 620 can store information regarding a user's preference(s) regarding thumbnail selection (e.g., historical information) and/or information regarding the user (e.g., demographic information) received from the media player 640. Accordingly, the media analyzer 620 can adaptively analyze the media input taking into account a user's preference(s) and/or information regarding a user. The media analyzer 620 can provide information associated with the content of the media input to the thumbnail generator 630. For example, if a first viewer has a preference for action-type scenes, the media analyzer can provide information to facilitate browsing/accessing action-related portions of a media. While another viewer is viewing the same media at a different time, and such user has a preference for romantic content, the media analyzer can provide information to facilitate this other viewer browsing/accessing romantic-related content associated with the same media. It is to be appreciated that the present invention can consider the preferences of a plurality of viewers and aggregate such preferences to facilitate optimizing the media experience for the group of viewers as a whole. Moreover, the present invention can stagger thumbnails so that even thumbnails are associated with preferences of a first viewer and odd thumbnails are associated with a concurrently viewing second viewer for example.

The thumbnail generator 630 can generate thumbnail image(s) based, at least in part, upon information received from the media analyzer 620, historical information associated with a user (e.g., historical information regarding previous selection(s) of thumbnail image(s) by the user), user preference(s) (e.g., time-based preference(s), for example, ten second interval(s)), and/or information regarding the user (e.g., demographic information associated with the user). For example, the thumbnail generator 630 can generate thumbnail image(s) based on thirty second intervals; however, the thumbnail generator 630, recognizing that a scene boundary occurs within a particular thirty second interval, can generate a thumbnail image associated with the scene change in place of one of the thirty second thumbnail images and/or add a thumbnail image associated with the scene change as an additional thumbnail image.

For example, the media analyzer 610 can receive and analyze a streaming media input. Thereafter, the thumbnail generator 630 can generate thumbnail image(s) associated with the streaming media input based, at least in part, upon analysis of the streaming media by the media analyzer 610. The thumbnail generator 630 can provide thumbnail image(s) associated with the streaming media to the media player 640 (e.g., previously streamed media and/or media to be streamed). As such, a user of the media delivery system 610 would have available the streaming media input and thumbnail image(s) associated with previous portion(s) of the streaming media input, thus allowing the user to select to play the streaming media at or about a previous point in time (e.g., associated with a thumbnail image). For example, for a live streaming media input, the user would be able to view the streaming media and thumbnail image(s) of previous point(s) in time associated with the streaming media (e.g., allowing the user to jump back to a previous point in the streaming media). Moreover, the content provider (e.g., media provider could stream thumbnails associated with portions of the media that have yet to be streamed allowing a user to advance to a future portion of the media from a present portion.

The media player 640 can receive the media input directly (e.g., from a media store) and/or from the media analyzer 620. Additionally, the media player 640 can receive thumbnail image(s) from the thumbnail generator 630. The media player 640 can provide an output (e.g., to a media display component (not shown)) based, at least in part, upon the media input and the thumbnail image(s).

Figure 7:
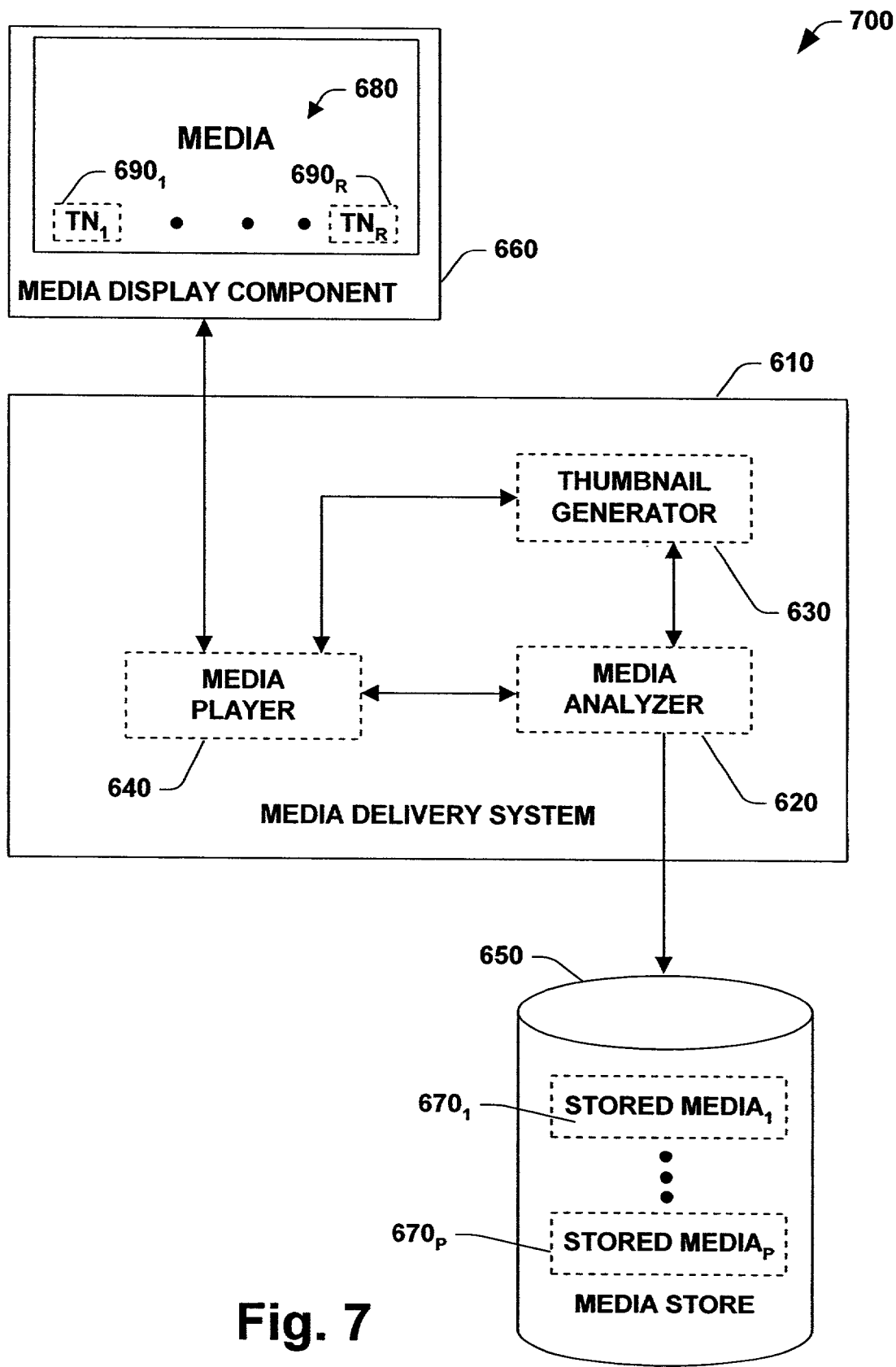
FIG. 7 is a block diagram of a media browsing system in accordance with an aspect of the present invention.

Turning briefly to FIG. 7, a media browsing system 700 in accordance with an aspect of the present invention is illustrated. The media browsing system 700 includes a media delivery system 610 having a media analyzer 620, a thumbnail generator 630 and a media player 640. The media browsing system 700 further includes a media store 650 and a media display component 660.

The media store includes a first stored media $670_1$ through a Pth stored media $670_P$, P being an integer greater to or equal to one. The first stored media $670_1$ through the Pth stored media $670_P$ can be referred to collectively as the stored media 670. The media store 650 is coupled to the media delivery system 610, for example, via a parallel electrical connection, a serial electrical connection, a cable television connection, a satellite connection, a computer network connection (e.g., utilizing the Internet), a Digital Subscriber Line ("DSL"), a telephone line, a cable modem, a wireless data communications link and/or an integrated services digital network ("ISDN").

The media display component 660 is adapted to display media 680 and is further adapted to display a first thumbnail image $690_1$ through an Rth thumbnail image $690_R$, R being an integer greater to or equal to one. The first thumbnail image $690_1$ through the Rth thumbnail image $690_R$ can be referred to collectively as the thumbnail image(s) 690. The thumbnail image(s) 690 are related to the media 680. The media display component 660 is coupled to the media delivery system 610, for example, via a parallel electrical connection, a serial electrical connection, a cable television connection, a satellite connection, a computer network connection (e.g., utilizing the Internet), a Digital Subscriber Line ("DSL"), a telephone line, a cable modem, a wireless data communications link and/or an integrated services digital network ("ISDN").

For example, a user of the media browsing system 700 can select a particular stored media 670 the user desires to view. Based upon the user's selection, the media delivery system 610 can receive at least a portion of the particular stored media 670 from the media store 650. The media analyzer 620 can analyze content of the particular stored media 670 and provide information associated with the content of the particular stored media 670 to the thumbnail generator 630. Thereafter, the thumbnail generator 630 can generate thumbnail image(s) based, at least in part, upon media content information received from the media analyzer 620. The media player 640 can provide an output to the media display component 660 based, at least in part, upon the particular stored media 670 and the thumbnail image(s) generated by the thumbnail generator 630.

Figure 8:
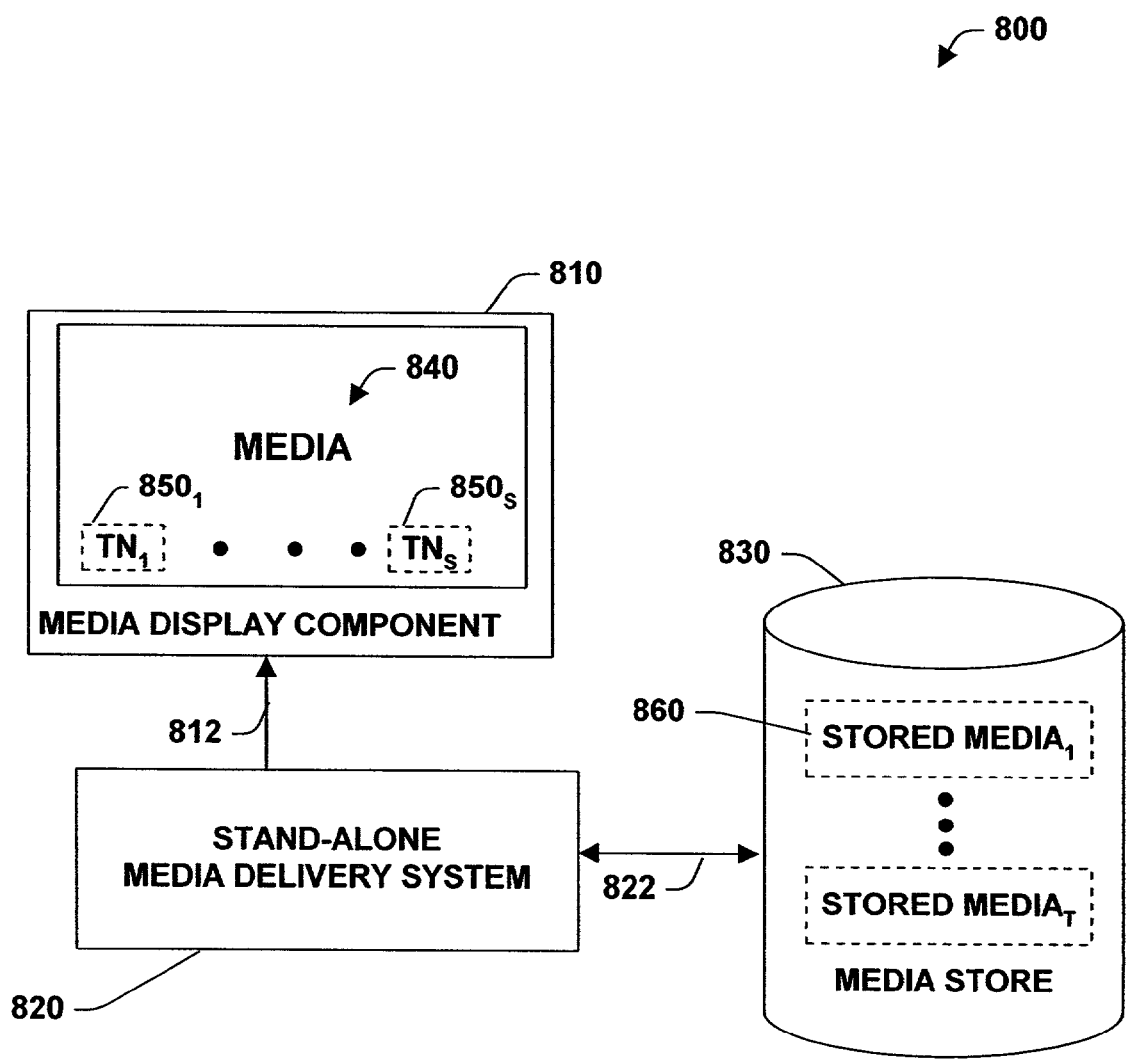
FIG. 8 is a block diagram of a media browsing system in accordance with an aspect of the present invention.

Referring next to FIG. 8, a media browsing system 800 in accordance with an aspect of the present invention is illustrated. The media browsing system 800 includes a media display component 810, a stand-alone media delivery system 820 and a media store 830.

The media display component 810 is adapted to display media 840. For example, the media display component 810 can include a television screen, a computer monitor and/or a touch screen. The media display component 820 is further adapted to display a first thumbnail image $850_1$ through an Sth thumbnail image $850_S$, S being an integer greater to or equal to one. The first thumbnail image $850_1$ through the Sth thumbnail image $850_S$ can be referred to collectively as the thumbnail image(s) 850. The thumbnail image(s) 850 are related to the media 840. The number of thumbnail image(s) 850 can be based, at least in part, upon a user's selection, user's preference(s) and/or analysis of the media 840 by the stand-alone media delivery system 820.

The media display component 810 is coupled to the stand-alone media delivery system 820 via a first communications link 812. For example, the first communications link can be a parallel electrical connection, a serial electrical connection, a cable television connection, a satellite connection, a computer network connection (e.g., utilizing the Internet), a Digital Subscriber Line ("DSL"), a telephone line, a cable modem, a wireless data communications link and/or an integrated services digital network ("ISDN").

The stand-alone media delivery system 820 is coupled to the media store 860 via a second communications link 822. For example, the second communications link 822 can be a parallel electrical connection, a computer network connection and/or a wireless communications link.

The media store 830 includes a first stored media $860_1$ through a Tth stored media $860_T$, T being an integer greater to or equal to one. The first stored media $860_1$ through the Tth stored media $860_T$ can be referred to collectedly as the stored media 860. For example, the media store 830 can include computer storage media (e.g., hard disc, CD's and/or DVD's). The stand-alone media delivery system 820 can obtain at least some of the stored media 860 and provide at least a portion thereof to the media display component 810 along with the thumbnail image(s) 850 related to the media 840.

Figure 9:
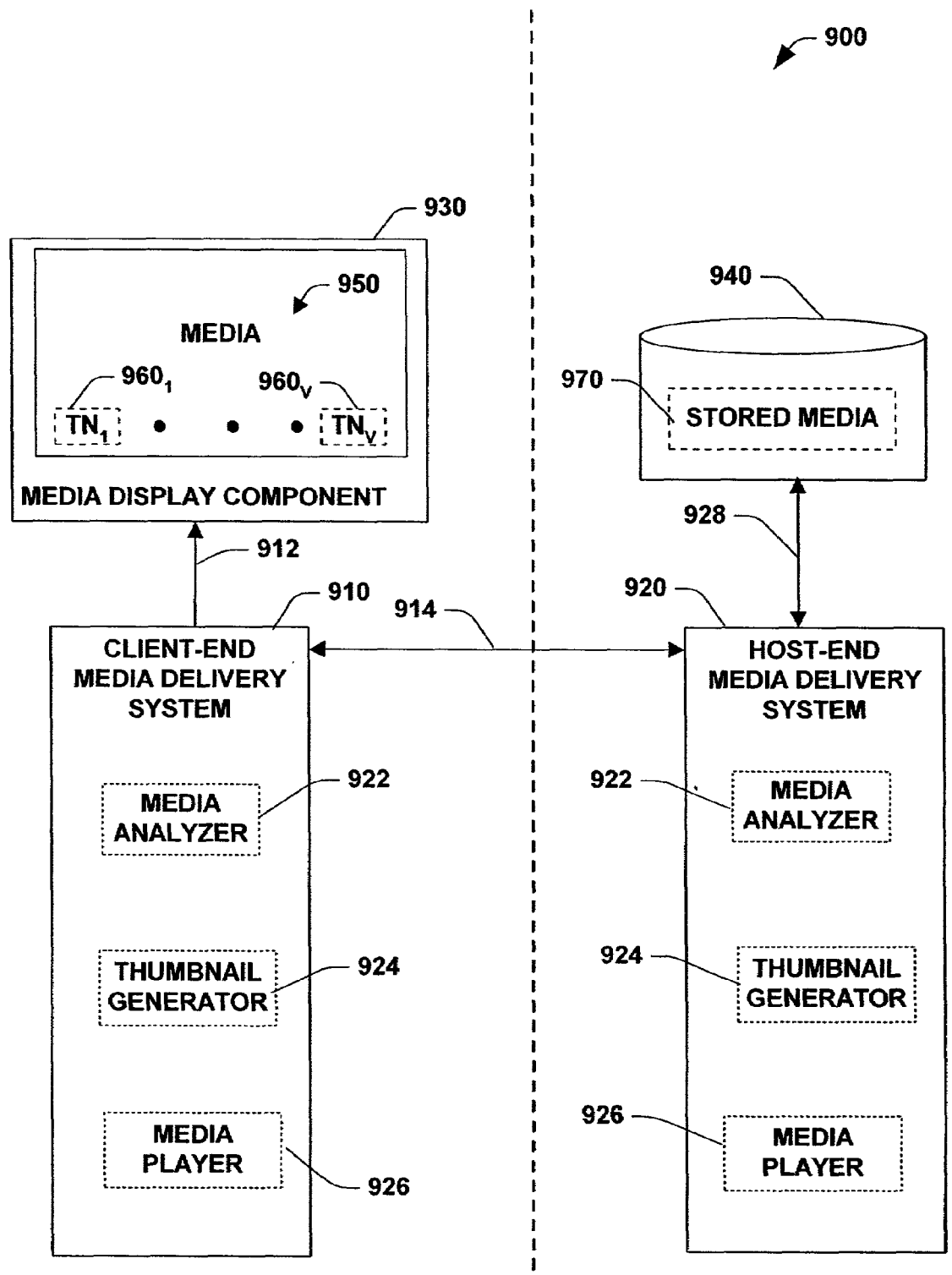
FIG. 9 is a block diagram distributed media browsing system in accordance with an aspect of the present invention.

Next, referring to FIG. 9, a distributed media browsing system 900 in accordance with an aspect of the present invention is illustrated. The distributed media browsing system 900 includes a client-end media delivery system 910, a host-end media delivery system 920, a media display component 930 and media store 940.

The client-end media delivery system 910 and/or the host-end media delivery system 920 can include a media analyzer 922, a thumbnail generator 924 and/or media player 926. The media analyzer 922 can receive a media input (e.g., from the media store 940) and analyze the media input (e.g., for scene change(s) and/or shot boundaries). Additionally, the media analyzer 922 can analyze media based, at least in part, upon a user's preference. The media analyzer 922 can utilize artificial intelligence technique(s) (e.g., Bayesian learning methods that perform analysis over alternative dependent structures and apply a score, Bayesian classifiers and other statistical classifiers, including decision tree learning methods, support vector machines, linear and non-linear regression, and neural network representation) in analyzing the media input. For example, the media analyzer 922 can store information regarding a user's preference(s) regarding thumbnail selection (e.g., historical information) and/or information regarding the user (e.g., demographic information). Accordingly, the media analyzer 922 can adaptively analyze the media input taking into account a user's preference(s) and/or information regarding a user. The media analyzer 922 can provide information associated with the content of the media input to the thumbnail generator 924.

The thumbnail generator 924 can generate thumbnail image(s) based, at least in part, upon information received from the media analyzer 922, historical information associated with a user (e.g., historical information regarding previous selection(s) of thumbnail image(s) by the user), user preference(s) (e.g., time-based preference(s), for example, ten second interval(s)), and/or information regarding the user (e.g., demographic information associated with the user). For example, the thumbnail generator 924 can generate thumbnail image(s) based on thirty second intervals; however, the thumbnail generator 924, recognizing that a scene boundary occurs within a particular thirty second interval, can generate a thumbnail image associated with the scene change in place of one of the thirty second thumbnail images and/or add a thumbnail image associated with the scene change as an additional thumbnail image.

The media player 926 can receive the media input (e.g., from media store 940) and thumbnail image(s) from the thumbnail generator 924. The media player 926 can provide an output to the media display component 930 based, at least in part, upon the media input and the thumbnail image(s).

The media display component 930 is adapted to display media 950. For example, the media display component 930 can include a television screen, a computer monitor and/or a touch screen. The media display component 930 is further adapted to display a first thumbnail image $960_1$ through a Vth thumbnail image $960_V$, V being an integer greater to or equal to one. The first thumbnail image $960_1$ through the Vth thumbnail image $960_V$ can be referred to collectively as the thumbnail image(s) 960. The thumbnail image(s) 960 are related to the media 950. The number of thumbnail image(s) 960 can be based, at least in part, upon a user's selection, user's preference(s) and/or analysis of the media 950 by the client-end media delivery system 910 and/or the host-end media delivery system 920.

The media display component 930 is coupled to the client-end media delivery system 910 by a first communications link 912. The first communications link 912 can be, for example, via a parallel electrical connection, a serial electrical connection, a cable television connection, a satellite connection, a computer network connection (e.g., utilizing the Internet), a Digital Subscriber Line ("DSL"), a telephone line, a cable modem, a wireless data communications link and/or an integrated services digital network ("ISDN").

The media store 940 includes stored media 970. The stored media 970 can be based on a television broadcast (e.g., real-time and/or recorded), cable television, computer network audio/video streaming (e.g., Internet-based), a video-tape, a Digital Video Disc ("DVD"), a Compact Disc ("CD") and/or a computer disc. The stored media 970 can be time-based, for example, on a movie. Additionally, the stored media 970 can include non time-based representation (s), for example, image(s) (e.g., photograph(s)).

The host-end media delivery system 920 can be coupled to the media store 940 by a second communications link 928. The second communications link 928 can be a parallel electrical connection, a serial electrical connection, a cable television connection, a satellite connection, a computer network connection (e.g., utilizing the Internet), a Digital Subscriber Line ("DSL"), a telephone line, a cable modem, a wireless data communications link and/or an integrated services digital network ("ISDN"). Similarly, the host-end media delivery system 920 can be coupled to the client-end media delivery system 910 by a third communications link 914. The third communications link 914 can be a parallel electrical connection, a serial electrical connection, a cable television connection, a satellite connection, a computer network connection (e.g., utilizing the Internet), a Digital Subscriber Line ("DSL"), a telephone line, a cable modem, a wireless data communications link and/or an integrated services digital network ("ISDN").

Figure 10:
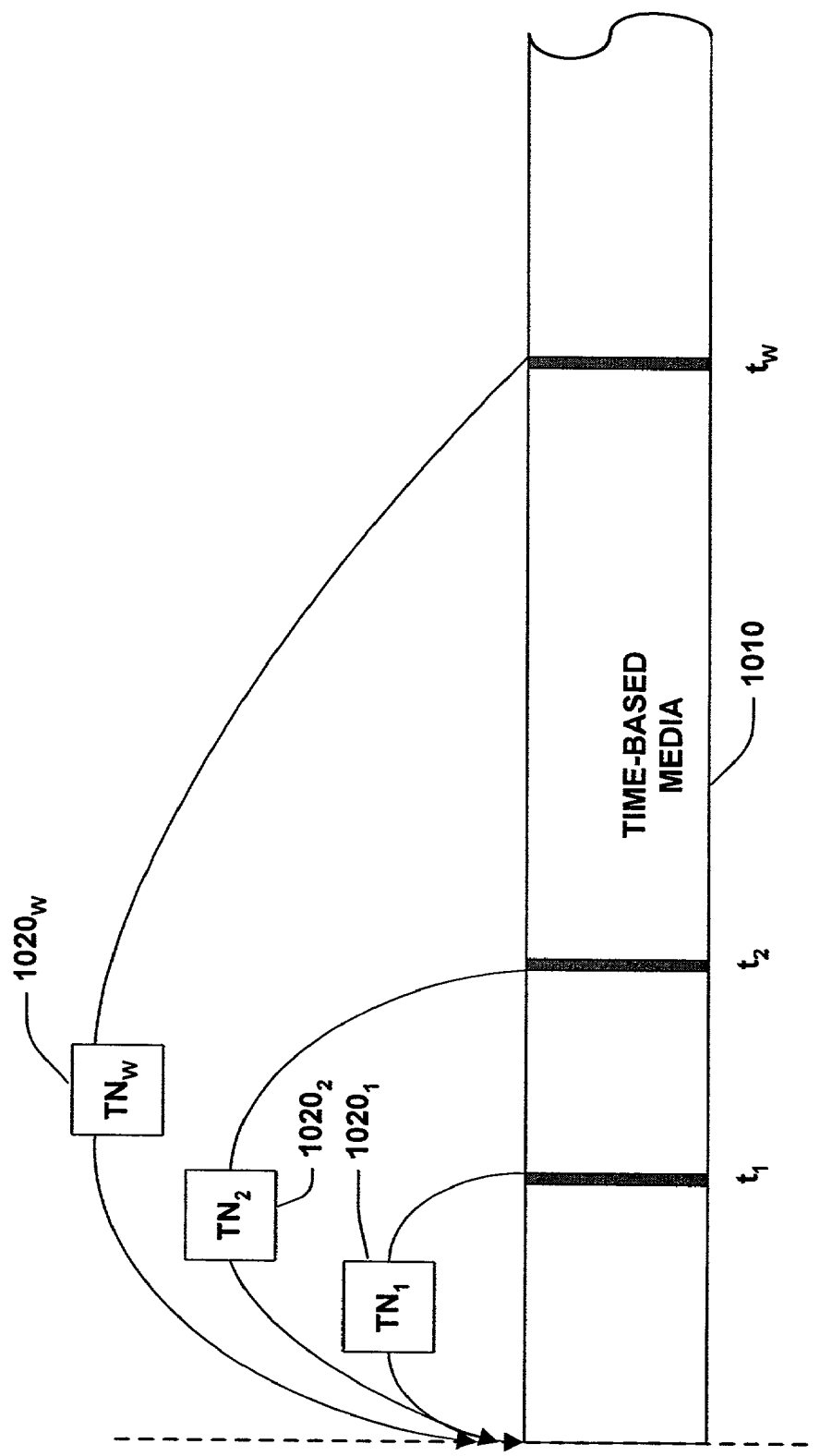
FIG. 10 is a time-line of time-based media in accordance with an aspect of the present invention.

Referring next to FIG. 10, a time-line of time-based media 1010 in accordance with an aspect of the present invention is illustrated. A first thumbnail image $1020_1$, a second thumbnail image $1020_2$ through a Wth thumbnail image $1020_W$, W being an integer greater to or equal to two, are associated with the time-based media 1010. For example, the first thumbnail image $1020_1$, the second thumbnail image $1020_2$ through the Wth thumbnail image $1020_W$ can be generated by a thumbnail generator (not shown) and/or a media delivery system (not shown). The first thumbnail image $1020_1$ is associated with the time-based media 1010 at time $t_1$, the second thumbnail image $1020_2$ is associated with the time-based media 1010 at time $t_2$. Similarly, the Wth thumbnail image $1020_W$ is associated with the time-based media 1010 at time $t_W$. For example, after selection of the second thumbnail image $1020_2$ (e.g., via a thumbnail selection component (not shown) and/or a media display component (not shown)), a user would then begin to view the time-based media 1010 commencing at or about time $t_2$.

Figure 11:
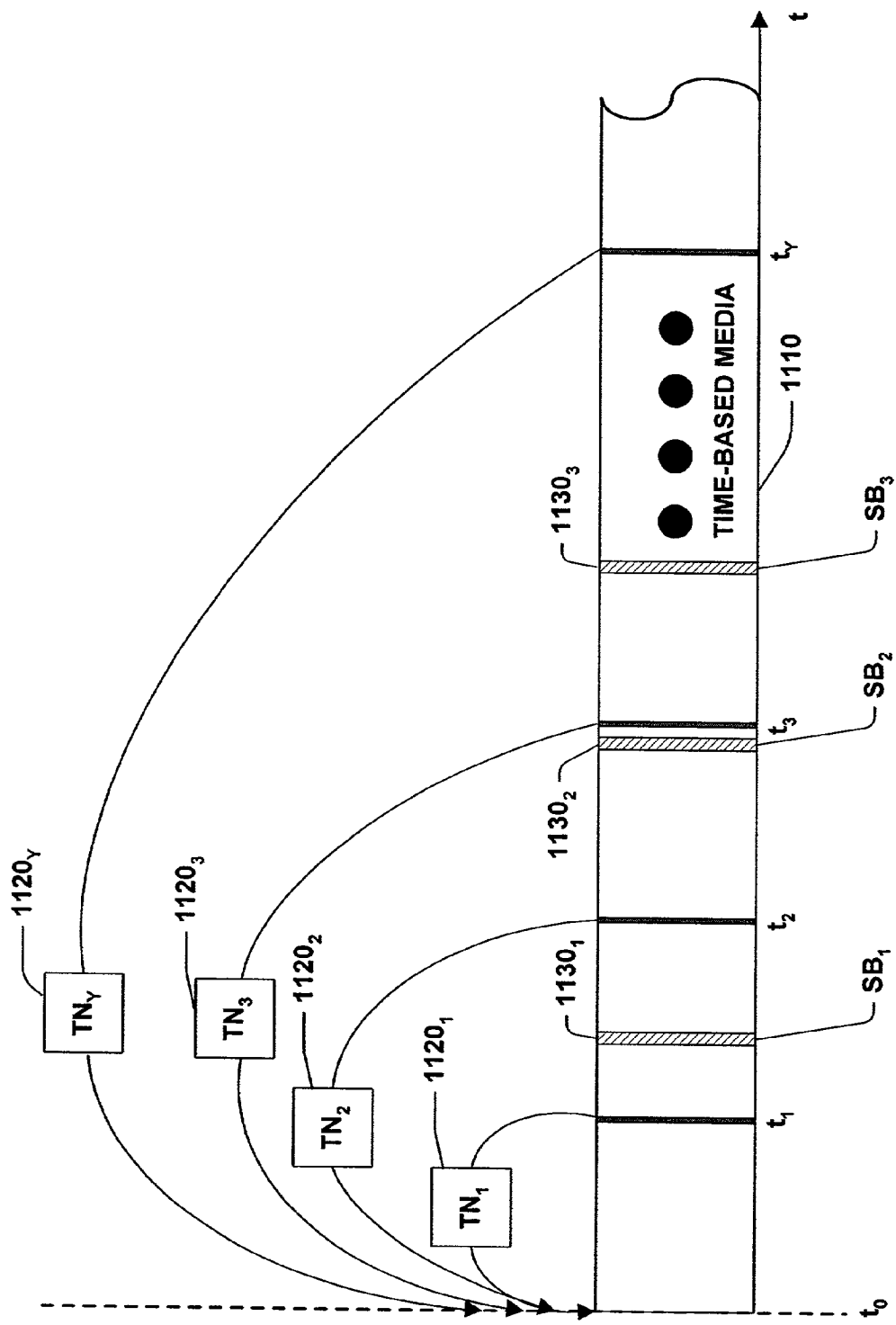
FIG. 11 is a time-line of time-based media in accordance with an aspect of the present invention.

Turning to FIG. 11, a time-line of time-based media 1110 in accordance with an aspect of the present invention is illustrated. A first thumbnail image $1120_1$, a second thumbnail image $1120_2$, a third thumbnail image $1120_3$ through a Yth thumbnail image $1120_Y$, Y being an integer greater to or equal to three, are associated with the time-based media 1110. The time-based media 1110 further has a first scene boundary 1130$_1$, a second scene boundary 1130$_2$ and a third scene boundary 1130$_3$. The scene boundaries 1130$_1$, 1130$_2$, 1130$_3$ can be determined, for example, by a media analyzer (not shown). In the example illustrated in FIG. 11, the second boundary 1130$_2$ occurs in close proximity to the third thumbnail image 1120$_3$. In one example, the third thumbnail image 1120$_3$ can be replaced with a thumbnail image associated with the second scene boundary 1130$_2$, for example, by a thumbnail generator (not shown). Further, threshold level(s) facilitating determination of proximity can be based, for example, upon user preference(s) and/or system default (s).

In view of the exemplary systems shown and described above, methodologies that may be implemented in accordance with the present invention will be better appreciated with reference to the flow charts of FIGS. 12, 13, 14 and 15. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement a methodology in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Figure 12:
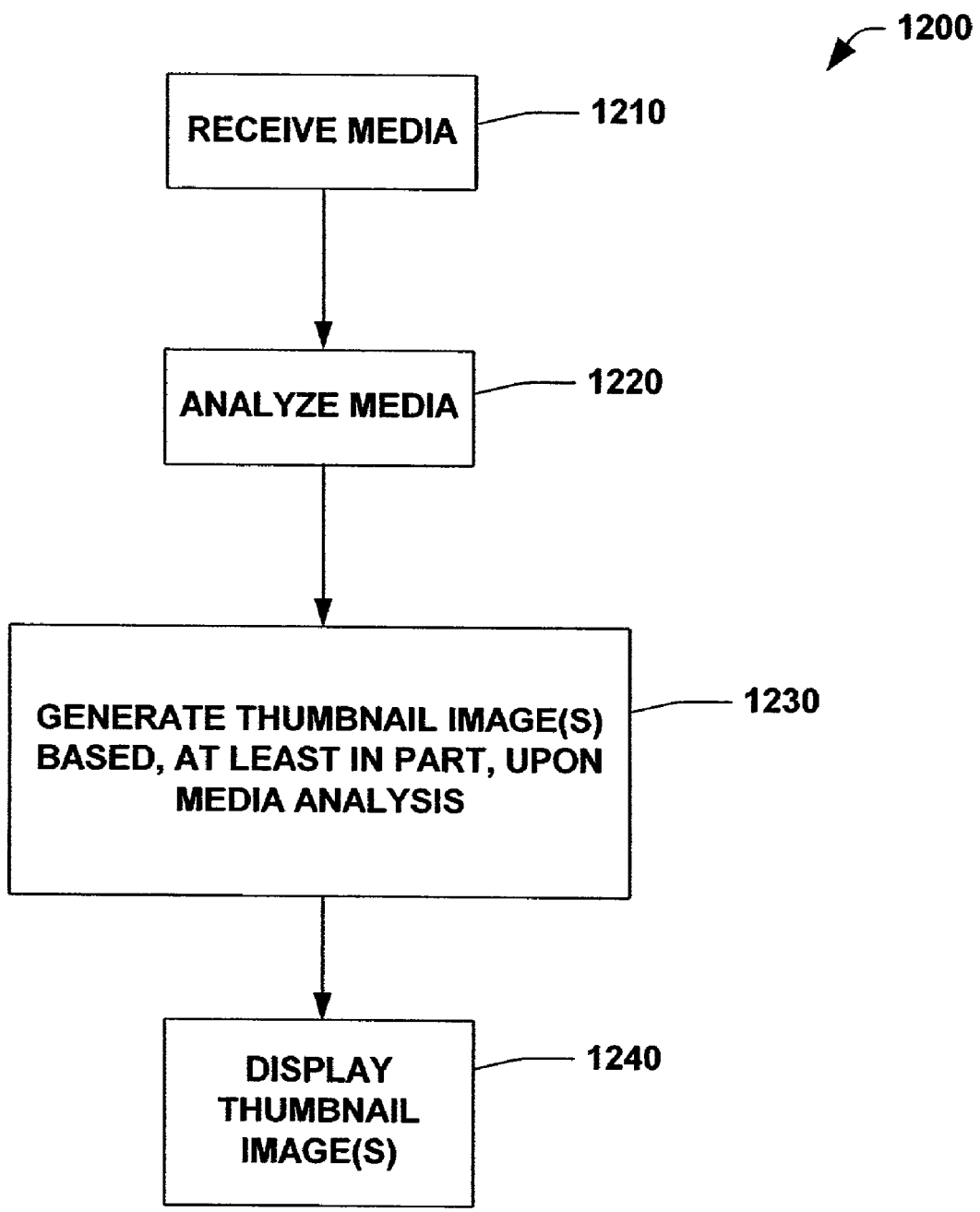
FIG. 12 is a flow chart illustrating a methodology for generating thumbnail image(s) in accordance with an aspect of the present invention.

Turning to FIG. 12, a methodology 1200 for generating thumbnail image(s) in accordance with an aspect of the present invention is illustrated. At 1210, media is received (e.g., from a media store). At 1220, the media is analyzed (e.g., by a media analyzer). At 1230, thumbnail image(s) are generated based, at least in part, on the media analysis. At 1240, thumbnail image(s) associated with the media are displayed (e.g., via media display component).

Figure 13:
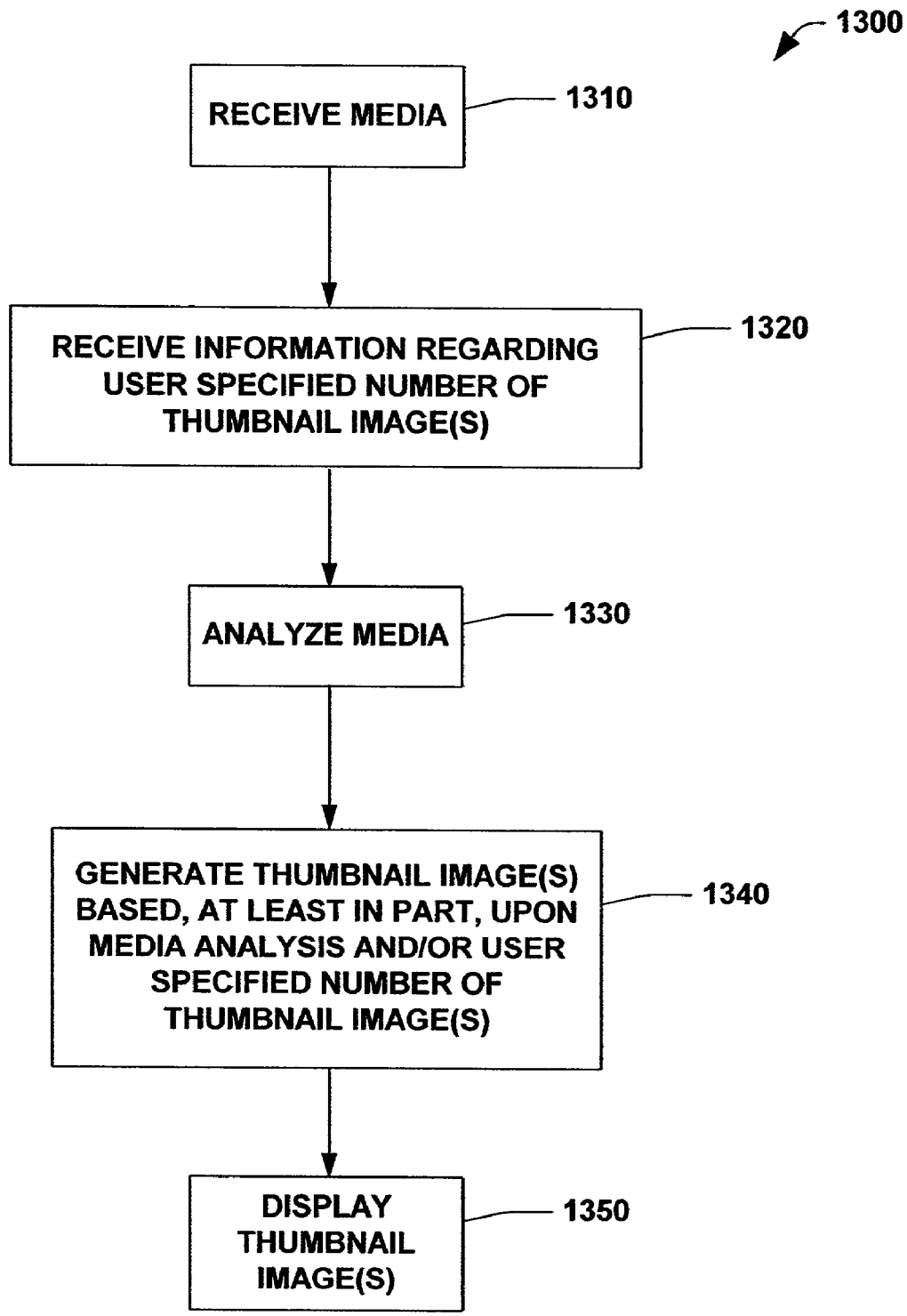
FIG. 13 is a flow chart illustrating a methodology for generating thumbnail image(s) in accordance with an aspect of the present invention.

Turning to FIG. 13, a methodology 1300 for generating thumbnail image(s) in accordance with an aspect of the present invention is illustrated. At 1310, media is received (e.g., from a media store). At 1320, information regarding user specified number of thumbnail image(s) is received. At 1330, the media is analyzed (e.g., by a media analyzer). At 1340, thumbnail image(s) are generated based, at least in part, on the media analysis and/or the user specified number of thumbnail image(s). At 1350, thumbnail image(s) associated with the media are displayed (e.g., via media display component).

Figure 14:
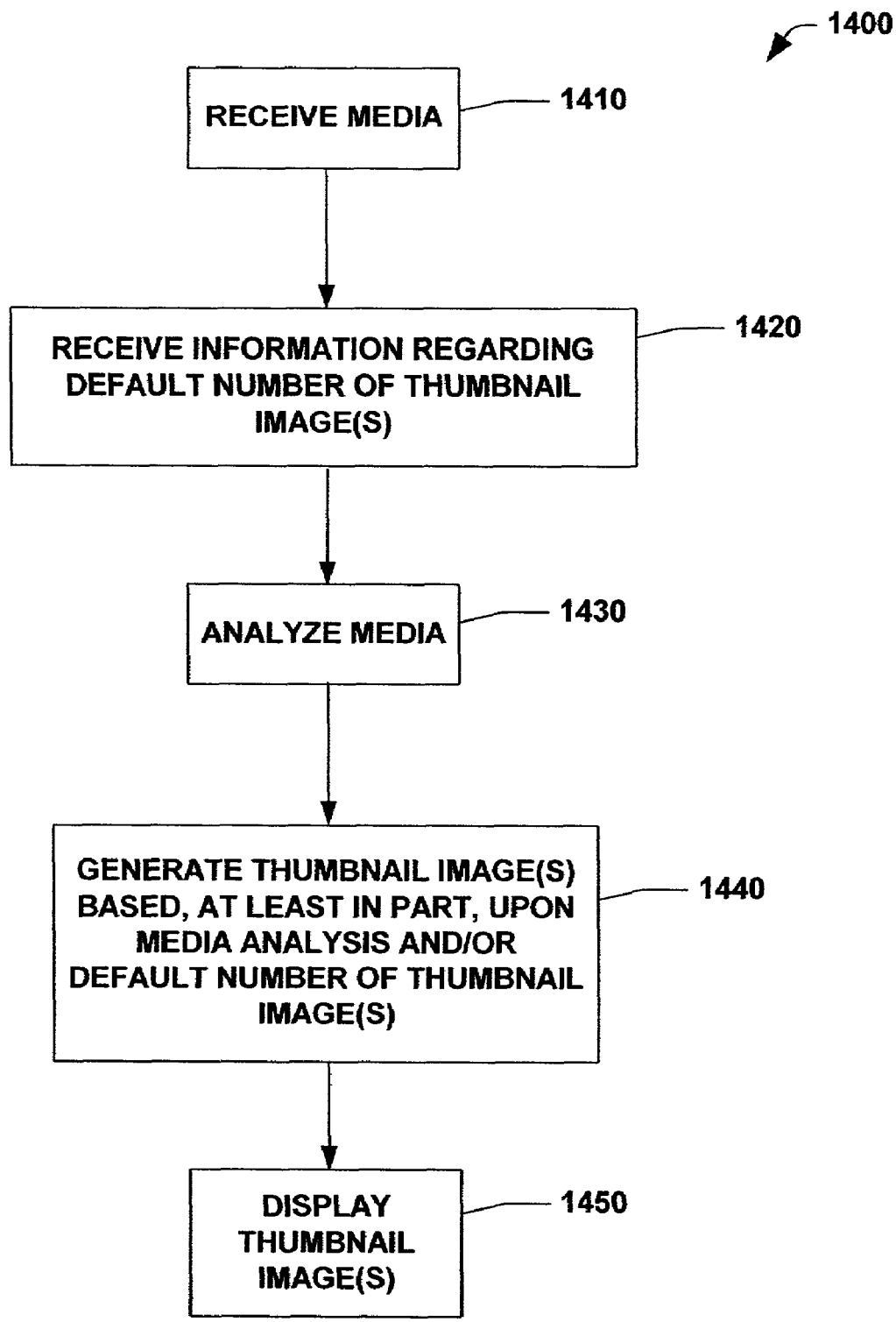
FIG. 14 is a flow chart illustrating a methodology for generating thumbnail image(s) in accordance with an aspect of the present invention.

Next, referring to FIG. 14, a methodology 1400 for generating thumbnail image(s) in accordance with an aspect of the present invention is illustrated. At 1410, media is received (e.g., from a media store). At 1420, information regarding default number of thumbnail image(s) is received. At 1430, the media is analyzed (e.g., by a media analyzer). At 1440, thumbnail image(s) are generated based, at least in part, on the media analysis and/or the default number of thumbnail image(s). At 1450, thumbnail image(s) associated with the media are displayed (e.g., via media display component).

Figure 15:
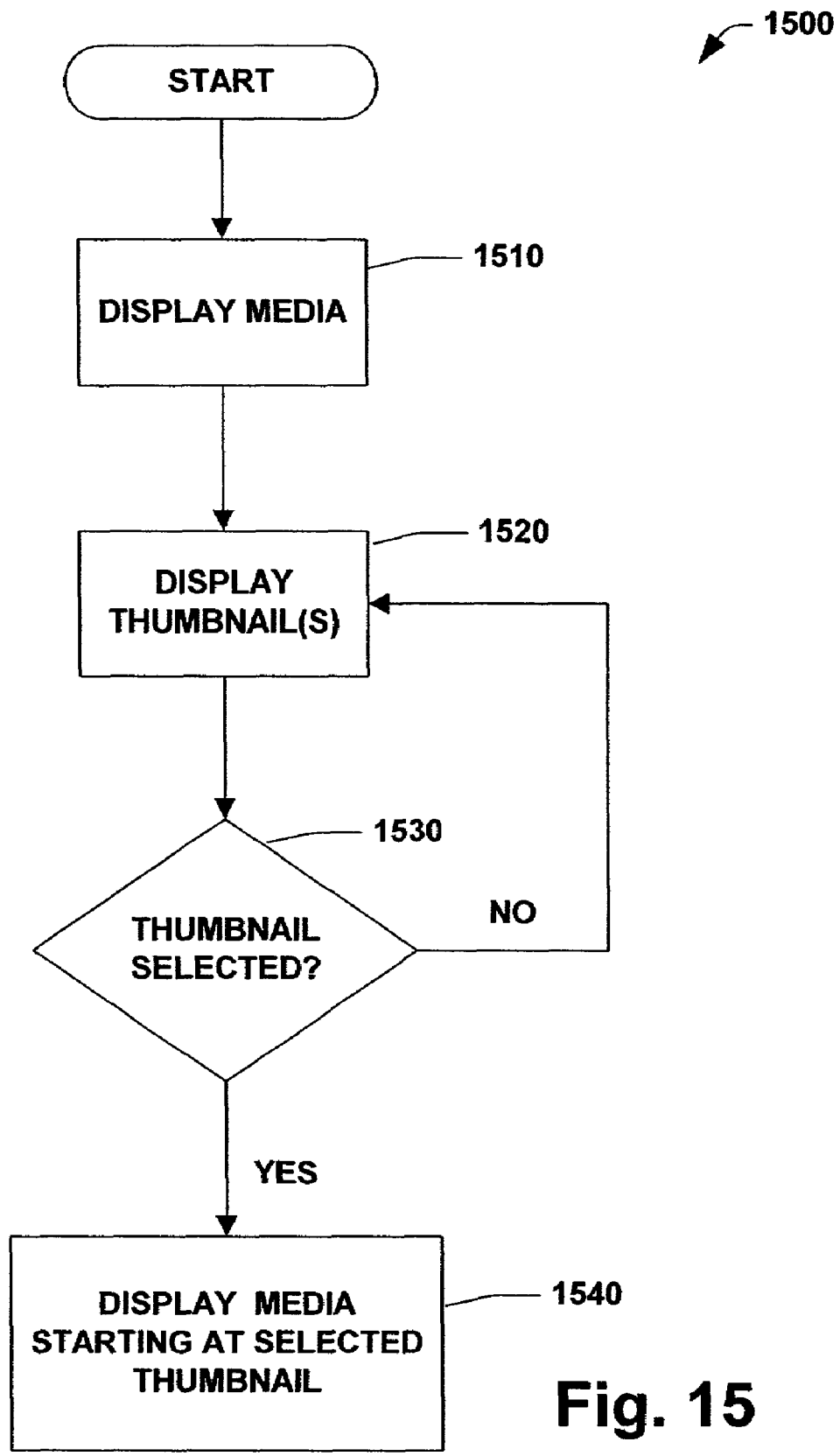
FIG. 15 is a flow chart illustrating a methodology for utilizing thumbnail image(s) in accordance with an aspect of the present invention.

Turning to FIG. 15, a methodology 1500 for utilizing thumbnail image(s) in accordance with an aspect of the present invention is illustrated. At 1510, media is displayed (e.g., via a media display component). At 1520, thumbnail image(s) are displayed. At 1530, a determination is made whether a particular thumbnail image has been selected. If the determination at 1530 is NO, processing continues at 1520. If the determination at 1530 is YES, at 1540, the media is displayed at or about the selected thumbnail image.

Figure 16:
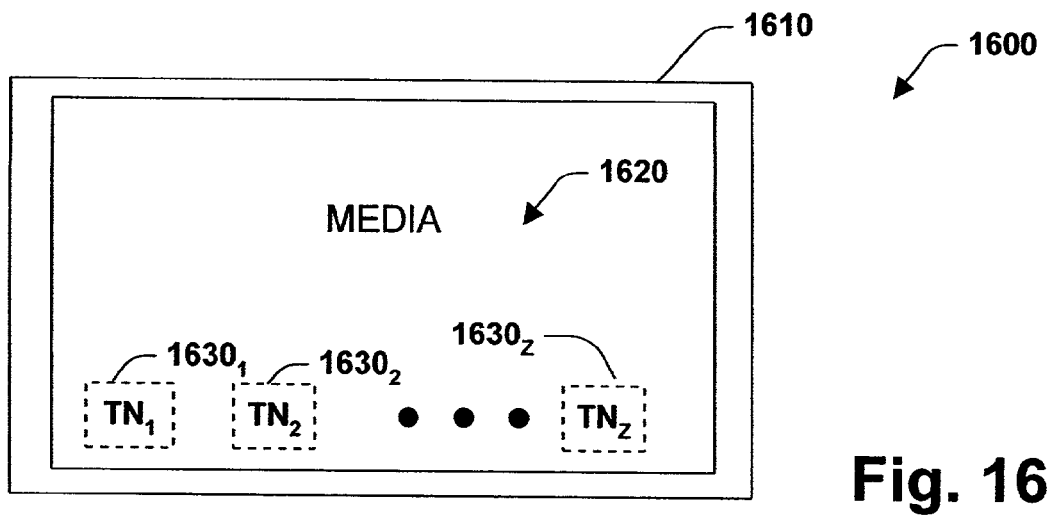
FIG. 16 is an exemplary screen shot of thumbnail images in accordance with an aspect of the present invention.
Figure 17:
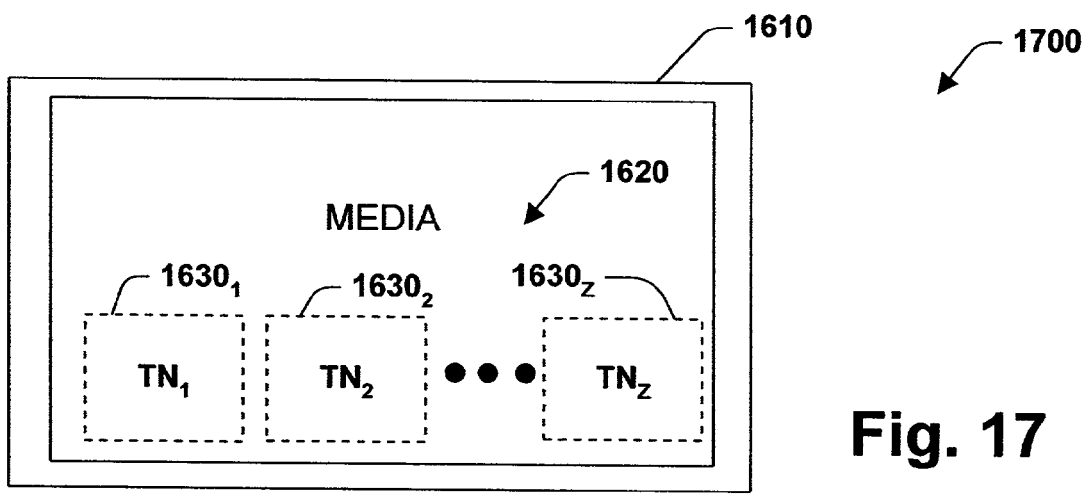
FIG. 17 is an exemplary screen shot of thumbnail images in accordance with an aspect of the present invention.
Figure 18:
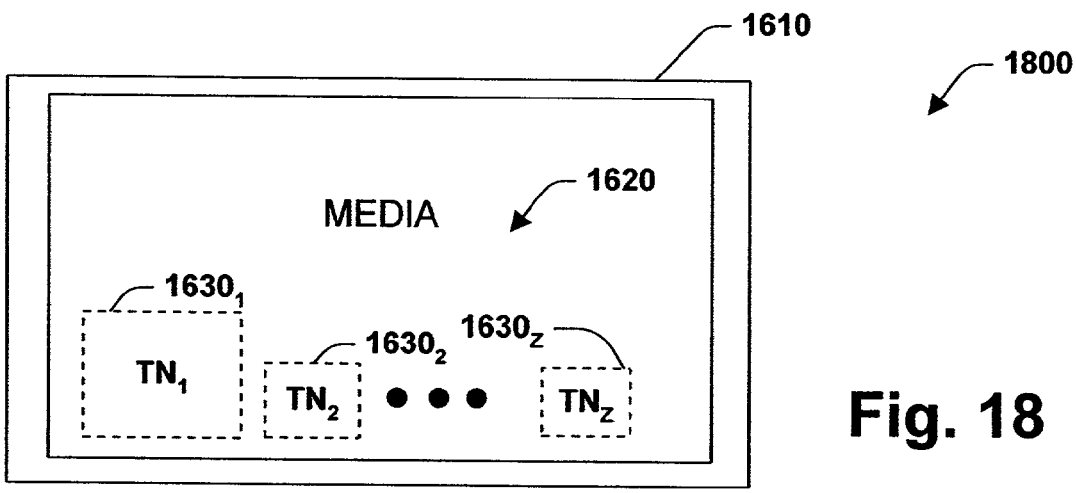
FIG. 18 is an exemplary screen shot of thumbnail images in accordance with an aspect of the present invention.

Next, referring to FIGS. 16, 17 and 18, exemplary screen shots 1600, 1700 and 1800, respectively, in accordance with aspects of the present invention are illustrated. A media display component 1610 having media 1620 and a first thumbnail image 1630$_1$, a second thumbnail image 1630$_2$ through a Zth thumbnail image 1630$_Z$, Z being an integer greater to or equal to two. The first thumbnail image 1630$_1$ through the Zth thumbnail image 1630$_Z$ can be referred to collectively as the thumbnail images 1630.

In FIG. 16, the thumbnail images 1630 have about the same physical dimensions when displayed via the media display component 1610. In FIG. 17, the thumbnail images 1630 have about the same physical dimensions when displayed via the media display component 1610; however, the thumbnail images 1630 mask more of the media 1620 than illustrated in FIG. 16. Referring next to FIG. 18, the first thumbnail image 1630$_1$ has physical dimension(s) that are different than the second thumbnail image 1630$_2$ and/or the Zth thumbnail image 1630$_Z$.

Figure 19:
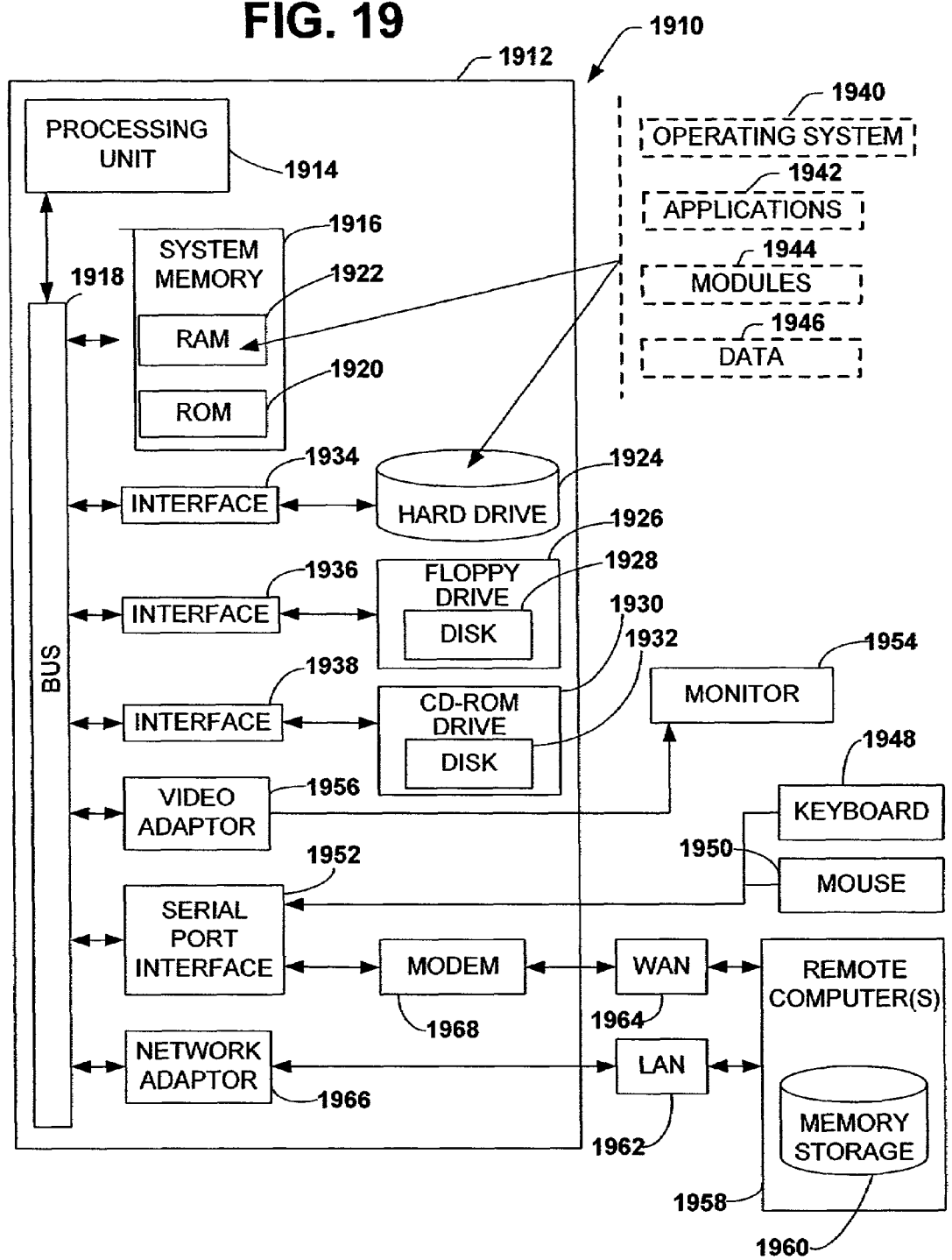
FIG. 19 is a schematic block diagram of an exemplary operating environment for a system configured in accordance with the present invention.

In order to provide additional context for various aspects of the present invention, FIG. 19 and the following discussion are intended to provide a brief, general description of one possible suitable computing environment 1910 in which the various aspects of the present invention may be implemented. It is to be appreciated that the computing environment 1910 is but one possible computing environment and is not intended to limit the computing environments with which the present invention can be employed. While the invention has been described above in the general context of computer-executable instructions that may run on one or more computers, it is to be recognized that the invention also may be implemented in combination with other program modules and/or as a combination of hardware and software. Generally, program modules include routines, programs, components, data structures, etc. that perform particular tasks or implement particular abstract data types. Moreover, one will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

FIG. 19 illustrates one possible hardware configuration to support the systems and methods described herein. It is to be appreciated that although a standalone architecture is illustrated, that any suitable computing environment can be employed in accordance with the present invention. For example, computing architectures including, but not limited to, stand alone, multiprocessor, distributed, client/server, minicomputer, mainframe, supercomputer, digital and analog can be employed in accordance with the present invention.

With reference to FIG. 19, an exemplary environment 1910 for implementing various aspects of the invention includes a computer 1912, including a processing unit 1914, a system memory 1916, and a system bus 1918 that couples various system components including the system memory to the processing unit 1914. The processing unit 1914 may be any of various commercially available processors. Dual microprocessors and other multi-processor architectures also can be used as the processing unit 1914.

The system bus 1918 may be any of several types of bus structure including a memory bus or memory controller, a peripheral bus, and a local bus using any of a variety of commercially available bus architectures. The computer memory 1916 includes read only memory (ROM) 1920 and random access memory (RAM) 1922. A basic input/output system (BIOS), containing the basic routines that help to transfer information between elements within the computer 1912, such as during start-up, is stored in ROM 1920.

The computer 1912 may further include a hard disk drive 1924, a magnetic disk drive 1926, e.g., to read from or write to a removable disk 1928, and an optical disk drive 1930, e.g., for reading a CD-ROM disk 1932 or to read from or write to other optical media. The hard disk drive 1924, magnetic disk drive 1926, and optical disk drive 1930 are connected to the system bus 1918 by a hard disk drive interface 1934, a magnetic disk drive interface 1936, and an optical drive interface 1938, respectively. The computer 1912 typically includes at least some form of computer readable media. Computer readable media can be any available media that can be accessed by the computer 1912. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer 1912. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

A number of program modules may be stored in the drives and RAM 1922, including an operating system 1940, one or more application programs 1942, other program modules 1944, and program non-interrupt data 1946. The operating system 1940 in the computer 1912 can be any of a number of commercially available operating systems.

A user may enter commands and information into the computer 1912 through a keyboard 1948 and a pointing device, such as a mouse 1950. Other input devices (not shown) may include a microphone, an IR remote control, a joystick, a game pad, a satellite dish, a scanner, or the like. These and other input devices are often connected to the processing unit 1914 through a serial port interface 1952 that is coupled to the system bus 1918, but may be connected by other interfaces, such as a parallel port, a game port, a universal serial bus ("USB"), an IR interface, etc. A monitor 1954, or other type of display device, is also connected to the system bus 1918 via an interface, such as a video adapter 1956. In addition to the monitor, a computer typically includes other peripheral output devices (not shown), such as speakers, printers etc.

The computer 1912 may operate in a networked environment using logical and/or physical connections to one or more remote computers, such as a remote computer(s) 1958. The remote computer(s) 1958 may be a workstation, a server computer, a router, a personal computer, microprocessor based entertainment appliance, a peer device or other common network node, and typically includes many or all of the elements described relative to the computer 1912, although, for purposes of brevity, only a memory storage device 1960 is illustrated. The logical connections depicted include a local area network (LAN) 1962 and a wide area network (WAN) 1964. Such networking environments are commonplace in offices, enterprise-wide computer networks, intranets and the Internet.

When used in a LAN networking environment, the computer 1912 is connected to the local network 1962 through a network interface or adapter 1966. When used in a WAN networking environment, the computer 1912 typically includes a modem 1968, or is connected to a communications server on the LAN, or has other means for establishing communications over the WAN 1964, such as the Internet. The modem 1968, which may be internal or external, is connected to the system bus 1918 via the serial port interface 1952. In a networked environment, program modules depicted relative to the computer 1912, or portions thereof, may be stored in the remote memory storage device 1960. It will be appreciated that the network connections shown are exemplary and other means of establishing a communications link between the computers may be used.

Figure 20:
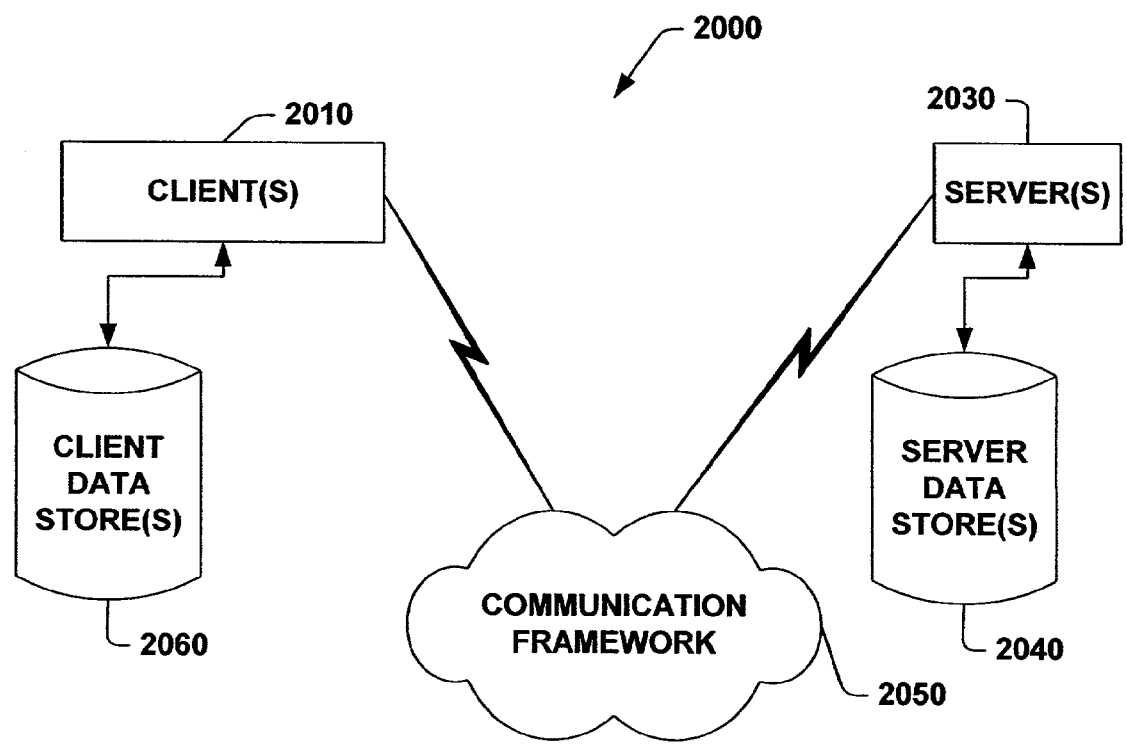
FIG. 20 is a schematic block diagram of an exemplary communication environment in accordance with the present invention.

FIG. 20 is a schematic block diagram of a sample computing environment 2000 with which the present invention can interact. The system 2000 includes one or more client(s) 2010. The client(s) 2010 can be hardware and/or software (e.g., threads, processes, computing devices). The system 2000 also includes one or more server(s) 2030. The server(s) 2030 can also be hardware and/or software (e.g., threads, processes, computing devices). The servers 2030 can house threads to perform transformations by employing the present invention, for example. One possible communication between a client 2000 and a server 2030 may be in the form of a data packet adapted to be transmitted between two or more computer processes. The system 2000 includes a communication framework 2050 that can be employed to facilitate communications between the client(s) 2010 and the server(s) 2030. The client(s) 2010 are operably connected to one or more client data store(s) 2016 that can be employed to store information local to the client(s) 2010. Similarly, the server(s) 2030 are operably connected to one or more server data store(s) 2040 that can be employed to store information local to the servers 2030.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A media browsing system, comprising:
   a media display component that displays a media input and at least one of a plurality of thumbnail images related to the media input; and,
   a media delivery system coupled to the media display component, the media delivery system provides the media input and the plurality of thumbnail images related to the media input to the media display component, the media delivery system further modifies the media input sent to the media display component based at least in part upon selection of one of the plurality of thumbnail images related to the media input, wherein at least one of the placement or the number of the plurality of thumbnail images is determined based at least in part on aggregated preferences of a plurality of users.

2. The media browsing system of claim 1, the media input is time-based.

3. The media browsing system of claim 1, the number of the plurality of thumbnail images is further based, at least in part, upon at least one of a user's selection and a user's preference.

4. The media browsing system of claim 1, the number of the plurality of thumbnail images is based, at least in part, upon at least one of a display area available associated with the media display component, an amount of the media input already displayed and an amount of the media input remaining to be displayed.

5. The media browsing system of claim 1, further comprising a media store storing a plurality of media input, the media store coupled to the media delivery system.

6. The media browsing system of claim 5, the media store comprising at least one of a hard disc, a CD, a DVD and a videotape.

7. The media browsing system of claim 1, further comprising a thumbnail selection component that facilitates a user's selection of the plurality of thumbnail images related to the media input.

8. The media browsing system of claim 7, the thumbnail selection component further comprising at least one of a remote control, a touch screen, a mouse and a joystick.

9. The media browsing system of claim 1, the media input is based on at least one of a television broadcast, a cable television broadcast, a video stream and an audio stream.

10. The media browsing system of claim 1, the media display component and the media delivery system coupled by at least one of a parallel electrical connection, a serial electrical connection, a cable television connection, a satellite connection, a computer network connection, an Internet connection, a Digital Subscriber Line, a telephone line, a cable modem, a wireless data communications link and an integrated services digital network.

11. The media browsing system of claim 1, the media display component further comprising at least one of a television screen, a computer monitor and a touch screen.

12. A media delivery system, comprising:
    a media analyzer that receives a media input, the media analyzer analyzes content of the media input;
    a thumbnail generator that generates a plurality of thumbnail images related to the media input based, at least in part, upon information regarding the content of the media input received from the media analyzer, wherein at least one of the placement or the quantity of the plurality of thumbnail images is determined based at least in part on joint preferences of a plurality of users; and,
    a media player that provides an output based, at least in part, upon at least one of the plurality of thumbnail images received from the thumbnail generator and the media input.

13. The media delivery system of claim 12, the thumbnail generator further generates the plurality of thumbnail images based, at least in part, upon at least one of a user's preference and a system default.

14. The media delivery system of claim 12, analysis of the media analyzer being based, at least in part, upon at least one of a user's preference, a scene change and a shot boundary.

15. The media delivery system of claim 12, the media analyzer utilizing a Bayesian decision making methodology.

16. The media delivery system of claim 12, the media analyzer further storing at least one of historical information and demographic information regarding a user.

17. A media browsing system, comprising:
    a media delivery system having a media analyzer that receives a media input, the media analyzer analyzes content of the media, the media delivery system further including a thumbnail generator that generates a plurality of thumbnail images related to the media input based, at least in part, upon information regarding the content of the media input received from the media analyzer, wherein at least one of the placement or the number of the plurality of thumbnail images is determined based at least in part on combined preferences of a plurality of users, the media delivery system further comprising a media player that provides an output based, at least in part, upon at least one of the plurality of thumbnail images received from the thumbnail generator and the media input; and
    a media display component to display media and the at least one of the plurality of thumbnail images related to the media received from the media delivery system.

18. The media browsing system of claim 17, further comprising a media store storing a plurality of media input, the media store coupled to the media delivery system by at least one of a parallel electrical connection, a serial electrical connection, a cable television connection, a satellite connection, a computer network connection, an Internet connection, a Digital Subscriber Line, a telephone line, a cable modem, a wireless data communications link and an integrated services digital network.

19. The media browsing system of claim 17, the media display component coupled to the media delivery system by at least one of a parallel electrical connection, a serial electrical connection, a cable television connection, a satellite connection, a computer network connection, an Internet connection, a Digital Subscriber Line, a telephone line, a cable modem, a wireless data communications link and an integrated services digital network.

20. A distributed media browsing system, comprising:
    a media display component that displays a media input and at least one of a plurality of thumbnail images related to the media input;
    a client-side media delivery system coupled to the media display component, the client-side media delivery system provides the media input and the at least one the plurality of thumbnail images related to the media input to the media display component;

a host-side media delivery system coupled to the client-side media delivery system;

a media store storing a plurality of media input, the media store coupled to the host-end media delivery system, at least one of the client-side media delivery system and the host-side media delivery system generates the plurality of thumbnail images related to the media input, at least one of the host-side media delivery system and the client-side media delivery system further modifies the media input sent to the media display component based at least in part upon selection of one of the plurality of thumbnail images related to the media input, wherein at least one of the placement or the quantity of the plurality of thumbnail images is determined based at least in part on an analysis of shared preferences of a plurality of users by at least one of the client-side media delivery system and the host-side media delivery system.

21. A streaming media browsing system, comprising:

a media delivery system having a media analyzer that receives a streaming media input, the media analyzer further analyzes content of the streaming media, the media delivery system further including a thumbnail generator that generates a plurality of thumbnail images related to the streaming media input based, at least in part, upon information regarding the content of the streaming media input received from the media analyzer, wherein at least one of the placement or the number of the plurality of thumbnail images is determined based at least in part on an analysis of collective preferences of a plurality of users by the media analyzer, the media delivery system further comprising a media player that provides an output based, at least in part, upon at least one the plurality of thumbnail images received from the thumbnail generator and the streaming media input; and a media display component to display the streaming media and the at least one the plurality of thumbnail images related to the streaming media received from the media delivery system.

22. A method for generating thumbnails facilitating media browsing, comprising:

analyzing a media input;

generating a plurality of thumbnail images associated with the media input based at least in part upon analysis of the media input, wherein the thumbnail images are placed at predetermined intervals, the thumbnail is placed at a scene change instead of a predetermined interval if the scene change is located within a predetermined proximity of the predetermined interval; and, displaying at least one of the plurality of thumbnail images.

23. The method of claim 22, generating the thumbnail image further based at least in part upon at least one of a user's preference and a system default.

24. A method for utilizing thumbnails facilitating media browsing, comprising:

displaying a media input;

displaying at least one of a plurality of thumbnail images associated with the media input, wherein the thumbnail images are placed at predetermined intervals, the thumbnail is placed at a scene change instead of a predetermined interval if the scene change is located within a predetermined proximity of the predetermined interval;

determining whether a particular thumbnail image has been selected; and, displaying media input associated with the selected thumbnail image, if it is determined that a particular thumbnail image has been selected.

25. A data packet transmitted between two or more computer processes, the data packet comprising:

information associated with a media input; and, information associated with at least one of a plurality of thumbnail images related to the media input, wherein the thumbnail images are placed at predetermined intervals, the thumbnail is placed at a scene change instead of a predetermined interval if the scene change is located within a predetermined proximity of the predetermined interval.

26. A computer readable medium having computer usable components for a media delivery system, comprising:

a media analyzer that receives a media input, the media analyzer further analyzes content of the media input; and, a thumbnail generator that generates a plurality of thumbnail images related to the media input based, at least in part, upon information regarding the content of the media input received from the media analyzer, wherein the thumbnail images are placed at predetermined time intervals of the media input, the thumbnail is placed at a scene change instead of a predetermined time interval if the scene change is located within a predetermined proximity of the predetermined time interval.

27. A media browsing system, comprising:

means for displaying a media input and at least one of a plurality of thumbnail images related to the media input; and, means for delivering the media input coupled to the means for displaying media, the means for delivering the media input provides the media input and the at least one of the plurality of thumbnail images related to the media input to the means for displaying media, the means for delivering media input further modifies the media input sent to the means for displaying media based at least in part upon selection of one of the at least one of the plurality of thumbnail image related to the media, wherein at least one of the placement or the number of the plurality of thumbnail images is determined based at least in part on an analysis of aggregated preferences of a plurality of users by the means for delivering the media input.

* * * * *